United States Patent
Sorokin et al.

(10) Patent No.: US 10,286,757 B2
(45) Date of Patent: May 14, 2019

(54) COMMUNICATION BETWEEN A VEHICLE AND A ROAD USER IN THE SURROUNDINGS OF A VEHICLE

(71) Applicant: Bayerische Motoren Werke Aktiengesellschaft, Munich (DE)

(72) Inventors: Lenja Sorokin, Munich (DE); Gunnar Franz, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/832,272

(22) Filed: Dec. 5, 2017

(65) Prior Publication Data

US 2018/0093553 A1    Apr. 5, 2018

Related U.S. Application Data

(63) Continuation of application No. 14/970,612, filed on Dec. 16, 2015, now Pat. No. 9,855,826.

(30) Foreign Application Priority Data

Dec. 17, 2014    (DE) .................. 10 2014 226 188

(51) Int. Cl.
  *B60J 1/04*    (2006.01)
  *B60Q 1/50*    (2006.01)
  (Continued)

(52) U.S. Cl.
  CPC . *B60J 1/04* (2013.01); *B60J 3/04* (2013.01); *B60Q 1/50* (2013.01); *B60Q 1/525* (2013.01)

(58) Field of Classification Search
  None
  See application file for complete search history.

(56) References Cited

U.S. PATENT DOCUMENTS 7,095,318 B1 *   8/2006   Bekhor .................... B60Q 1/26
                                              340/464
8,954,252 B1 *   2/2015   Urmson ................. G08G 1/166
                                              180/167
(Continued)

FOREIGN PATENT DOCUMENTS

DE           203 16 660 U1    12/2003
DE      10 2008 038 816 A1     2/2010
(Continued)

OTHER PUBLICATIONS

German Search Report issues in counterpart German Application No. 10 2014 226 188.0 dated Sep. 2, 2015 with partial English translation (Fourteen (14) pages).

*Primary Examiner* — Jonathan M Dager
*Assistant Examiner* — Garrett F Evans
(74) *Attorney, Agent, or Firm* — Crowell & Moring LLP (57) ABSTRACT

A method and a corresponding device permit an at least partially computer-controlled and/or autonomous vehicle to communicate with its surroundings, in particular with a road user such as a person in its surroundings. A control unit for a vehicle is configured to receive surroundings data from one or more surroundings sensors of the vehicle and to detect at least one road user in the surroundings of the vehicle on the basis of the surroundings data. The control unit is configured to determine on the basis of the surroundings data whether there is a need for communication between the road user and the vehicle. The control unit is configured, if it has been determined that there is a need for communication between the road user and the vehicle, to actuate an adaptation system of the vehicle and/or one or more visual communication system in order to communicate with the road user.

18 Claims, 2 Drawing Sheets

(51) Int. Cl.
*B60Q 1/52* (2006.01)
*B60J 3/04* (2006.01)

(56) References Cited

U.S. PATENT DOCUMENTS

| | | | | |
|---|---|---|---|---|
| 2004/0246114 | A1* | 12/2004 | Hahn | G08G 1/166 340/435 |
| 2010/0283590 | A1* | 11/2010 | Tee | A42B 3/044 340/432 |
| 2014/0333201 | A1* | 11/2014 | Foltin | B60Q 1/143 315/82 |
| 2015/0116344 | A1* | 4/2015 | Won | G09G 3/32 345/589 |

FOREIGN PATENT DOCUMENTS

| | | |
|---|---|---|
| DE | 10 2010 025 705 A1 | 1/2012 |
| DE | 10 2011 081 396 A1 | 2/2013 |
| DE | 10 2011 081 432 A1 | 2/2013 |

\* cited by examiner

COMMUNICATION BETWEEN A VEHICLE AND A ROAD USER IN THE SURROUNDINGS OF A VEHICLE

CROSS REFERENCE TO RELATED APPLICATIONS

This application is a Continuation application of U.S. application Ser. No. 14/970,612, filed Dec. 16, 2015, which claims priority under 35 U.S.C. § 119 from German Patent Application No. 10 2014 226 188.0, filed Dec. 17, 2014, the entire disclosure of which is herein expressly incorporated by reference.

BACKGROUND AND SUMMARY OF THE INVENTION

The invention relates to a method and to a corresponding device which permit an, in particular, at least partially computer-controlled and/or autonomous vehicle to communicate with its surroundings, in particular with a road user such as, for example, a person in the surroundings of the vehicle.

At present, within the scope of various initiatives on the subject matter of "Intelligent Transportation Systems" (ITS), communication protocols and co-operative safety applications which are intended in the future to make possible co-operative and, where possible, accident-free driving across all vehicle manufacturers are being standardized at, inter alia, the European Standardization Authorities ETSI and CEN as well as at ISO, SAE and IEEE in the USA. The co-operative safety applications also include, inter alia, collision-avoidance applications and applications for mitigating the consequences of collisions (collision mitigation) for side-impact accidents and head-on impact accidents. The addressed safety applications and the associated transmission protocols and data formats are documented, inter alia, in ETSI Standard TS 102 637 and in the SAE Standard SAEJ2735. For example, standard TS 102 637-2 defines what is referred to as a co-operational information message (referred to as a Cooperative Awareness Message, CAM) which is transmitted at periodic intervals by an ITS station (for example by a vehicle), in order to inform other ITS stations (for example other vehicles) in the surroundings about selected information (for example speed, acceleration and/or position) of the transmitting ITS station. The information which is exchanged between the ITS stations, for example on the basis of the CAM messages, can be used in the respective ITS stations to detect risks of collisions and, if appropriate, initiate suitable countermeasures (for example warning messages).

The communication methods defined within the scope of ITS are aimed at communication between different ITS stations (i.e. different machines or different electronic appliances). Direct communication between machine and man is not taken into account here. In particular, no communication is considered or made possible between at least partially computer-controlled or autonomous vehicles and persons in the surroundings of the vehicle. Such communication can, however, serve to increase the safety and acceptance of computer-controlled and autonomous vehicles in road traffic.

The present document is concerned with the technical problem of permitting direct communication between a vehicle (for example a passenger car, a truck or a motorcycle) and its surroundings, in particular with a road user such as, for example, a person in its surroundings. In this context, in particular targeted communication with one or more selected road users is to be made possible.

The problem is solved in accordance with embodiments of the invention.

According to one aspect, a control unit for a vehicle is described. The vehicle can be a single- or a dual-track vehicle, in particular a passenger car or a truck. The vehicle can be configured to move in road traffic without intervention by a driver. In other words, the vehicle can be an at least partially computer-controlled and/or autonomous vehicle and/or a vehicle in the highly automated driving mode (HAF mode) or in the automated driving mode (AF mode).

The control unit is configured to receive surroundings data from one or more surroundings sensors of the vehicle. The surroundings data can include information relating to the surroundings of the vehicle. The one or more surroundings sensors can be a camera, a laser, an ultrasonic sensor and/or a radar sensor. Furthermore, the control unit can be configured to receive position data from a position unit (for example from a navigation system) of the vehicle. The position data can be used to position the vehicle relative to a road arrangement and/or relative to other road users.

The control unit is also configured to detect at least one road user in the surroundings of the vehicle on the basis of the surroundings data (and, if appropriate, on the basis of the position data). In particular, a road user in the form of a person can be detected. The control unit can also be configured to detect at the same time a multiplicity of different road users at different positions in the surroundings of the vehicle.

Furthermore, the control unit is configured to determine on the basis of the surroundings data whether there is a need for communication between the road user and the vehicle. A need for communication can be present, in particular, depending on a current traffic situation between the road user and the vehicle.

In particular, it is possible to determine on the basis of the surroundings data that the road user is in the process of identifying whether he has been detected by the vehicle. In other words, it can be detected that the detected road user is attempting to make contact with the vehicle (for example with a driver of the vehicle), in order to ensure that the road user has been perceived by the vehicle (or by the driver of the vehicle). Such a situation occurs, for example, when there is a pedestrian who wishes to cross the road at a pedestrian crosswalk and before stepping out into the road throws a glance at the approaching vehicle in order to ensure that the vehicle has perceived (i.e. detected) him.

In order to determine whether there is a need for communication between the road user and the vehicle, the control unit can be configured to detect the eyes of a road user in the form of a person on the basis of the surroundings data (for example on the basis of image data). Furthermore, the control unit can be configured to determine on the basis of the detected eyes that there is a need for communication between the road user and the vehicle. In particular, on the basis of the detected eyes of the road user it can be determined that the road user is in the process of determining whether he has been detected by the vehicle. For example, a glance by the road user in the direction of a windshield of the vehicle can be an indication that the road user is in the process of checking whether he has been detected by the vehicle.

The control unit is also configured to cause one or more communication systems of the vehicle to generate an output if it has been determined that there is a need for communication between the road user and the vehicle, in particular if it has been determined that the road user is in the process of identifying whether he has been detected by the vehicle. The output can be aimed, in particular, at indicating to the road user that he has been detected by the vehicle and/or the function (relating to the traffic situation) in which the road user has been detected by the vehicle. Furthermore, the output can be aimed at indicating to the road user the intention of the vehicle with respect to the present traffic situation.

In particular, the control unit can be configured to cause adaptation systems of the vehicle to adapt an external appearance of the vehicle in order to communicate with the detected road user or in order to transmit a message to the detected road user. The adaptation systems can comprise, for example, means for changing an appearance of a headlight of the vehicle. Alternatively or additionally, the adaptation systems can, for example, comprise means for changing an appearance of a bumper of the vehicle. Alternatively or additionally, the adaptation systems can, for example, comprise means for changing an appearance of a side mirror, of a windshield, of a mudflap and/or of an engine hood of the vehicle. The adaptation systems can comprise, for example, one or more moving elements of the vehicle for adapting the appearance of the vehicle. Alternatively or additionally, the adaptation systems can comprise a color-changing material and/or a color-changing surface of the vehicle or a material which changes its shape and/or a surface of the vehicle which changes its shape. Examples of this are surface coating agents which can change their color, switchable windows/films and shape-memory polymers.

By adapting the external appearance of the vehicle it is possible, for example, to communicate in a reliable way to the detected road user that the road user has been detected by the vehicle. Furthermore, a future intention (for example the vehicle will come to a stop and allow the road user to cross the road) and/or a future behavior (for example determined or restrained) can be communicated by way of the external appearance.

The control unit can also be configured to determine on the basis of the surroundings data a position of the road user relative to the vehicle. The control unit can then adapt the appearance of the vehicle on the basis of the adaptation systems and as a function of the position of the road user. For example it is possible to change the appearance of the vehicle only at the points of the vehicle which are visible to the detected road user. In this way it is possible to avoid a miscommunication (for example with another road user).

The control unit can be configured to identify a specific traffic situation between the vehicle and the road user on the basis of the surroundings data. Furthermore, the control unit can be configured to determine an intention of the vehicle with respect to the identified traffic situation. Furthermore, the control unit can be configured to adapt the appearance of the vehicle on the basis of the adaptation systems and as a function of the identified traffic situation and/or as a function of the intention of the vehicle.

The adaptation systems can include means for changing the transparency of a side window and/or of a windshield of the vehicle (for example a window can be darkened and/or made semi-transparent). The control unit can also be configured to determine on the basis of the surroundings data that the detected road user is attempting to make visual contact with a driver of the vehicle. In particular, it can be detected that the road user is in the process of checking whether he has been perceived by the driver of the vehicle. The control unit can be configured subsequently to cause the adaptation systems to reduce the transparency of the side window and/or of the windshield in order to inform the road user that the driver is not controlling the vehicle. In particular, the road user's view of the driver can be reduced or prohibited by reducing the transparency.

It is therefore possible to change the front side window and/or windshield of the vehicle in such a way that these windows are semi-transparent or darkened and the view of the detected road user of the driver of the vehicle is limited. As a result, it is communicated to the road user that the driver is not actively participating in the events and is therefore not a party to communication with the road user. The reduction in the transparency occurs, for example, through switchable windows. By changing the appearance in this way it is possible to avoid misunderstandings which are caused, for example, by unintended communication by the person who is in the driver's seat but who is not taking part in the events on the road since the vehicle is driving autonomously or in a highly automated fashion.

Alternatively or additionally, the control unit can be configured to cause one or more visual communication systems of the vehicle to generate a visual output in order to communicate with the detected road user. In this context, the one or more visual communication systems each have a multiplicity of light points by which in each case a graphic symbol and/or a pictogram can be displayed as a visual output. A visual communication system can have a round shape, with the result that a visual output can be generated in different directions. By using a visual communication system with a multiplicity of light points it is possible for precise communication with the detected road user to take place.

With the invention it is advantageously possible for vehicle communication to take place by way of a visual communication system and/or by adapting the appearance of the vehicle.

The control unit can be configured to identify that the vehicle is in an automatic driving mode in which the vehicle moves in the road traffic without intervention by a driver. Subsequently, the control unit can cause the one or more visual communication systems to be moved from a first position, in which the one or more visual communication systems cannot be seen from the outside, into a second position, in which the one or more visual communication systems can be seen from the outside. It is therefore possible to ensure that the one or more visual communication systems do not disrupt in a manual driving mode of the vehicle.

On the other hand, it is possible to display to a road user in a simple way by means of a visual communication system which can be seen from the outside that the vehicle is in the autonomous driving mode.

The control unit can be configured to determine lighting conditions in the surroundings of the vehicle on the basis of the surroundings data. Furthermore, the control unit can be configured to adapt the visual output generated by way of the one or more visual communication systems, as a function of the lighting conditions. It is therefore possible to ensure that the visual output can be seen by a detected road user even under poor lighting conditions.

The control unit can be configured to identify the presence of a specific traffic situation between the vehicle and the road user. The control unit can also be configured to identify a property of the road user (for example a child or adult). Furthermore, the control unit can be configured to identify a speed of the vehicle. The visual output generated by way of the one or more visual communication systems can then be adapted as a function of the traffic situation, the property of the road user and/or the speed of the vehicle. It is therefore possible to increase the quality of communication.

The control unit can be configured to identify a position of the road user relative to the vehicle on the basis of the surroundings data. Furthermore, the control unit can be configured to adapt the visual output generated by way of the one or more visual communication systems, as a function of the position of the road user. In particular, the visual output can be generated in such a way that the visual output can be seen by the detected road user. On the other hand, no visual output can occur in other directions which do not correspond to the direction of the detected road user. It is therefore possible for targeted communication with the detected road user to take place (without confusing other road users).

The control unit can be configured to cause the one or more visual communication systems of the vehicle to generate a visual output which includes a symbol and/or a pictogram (and/or displays a representation thereof) which points in a direction of the detected road user. Such "pointing" to the detected road user makes it possible to convey unambiguously to the detected road user that the communication originating from the vehicle is directed at him.

The control units which are described in this document ensure that road users, in particular road users in the form of persons, are detected by the vehicle even without the intervention by a driver of the vehicle and are informed by the vehicle that they have been detected. Conversely, this also means that it becomes clear to the road user when he has not been detected by the vehicle. The certainty about the perception and about having been perceived in road traffic and information relating to the intention of the vehicle typically bring about an increase in the safety in road traffic. It is therefore possible for the described control units to contribute to increasing the safety of (if appropriate autonomous) vehicles in road traffic, in particular with respect to road users in the form of persons.

The control unit can be configured to identify one or more indications of an intention of the road user on the basis of the surroundings data and, if appropriate, on the basis of the position data. The one or more indications of an intention of the road user can include, for example, a direction of movement of the road user relative to the vehicle (from which it can be inferred, for example, that the road user would like to cross the road in front of the vehicle), a viewing direction of the road user relative to the vehicle (looking to the right/left indicates, for example, that the road user would like to cross a road), a road sign and/or a traffic installation in the surroundings of the vehicle and the road user (a pedestrian crosswalk indicates, for example, that a road user would like to cross the road).

On the basis of the one or more indications it is then possible to determine that there is a need for communication between the road user and the vehicle. In particular it can be determined that there is a specific traffic situation between the vehicle and the road user. The traffic situation can be here, for example, a possible risk of collision between the vehicle and the road user. The control unit can be configured to cause the one or more communication systems (in particular the adaptation systems and/or the visual communication systems) of the vehicle to generate an output (if appropriate a further output) in order to indicate to the road user how the vehicle will behave with respect to the traffic situation. In other words the communication systems of the vehicle (in particular the adaptation systems and/or the one or more visual communication systems) can be actuated as a function of the traffic situation. It is therefore possible, in particular, for a road user in the form of a person to aquire certainty as to whether or not the vehicle represents a hazard. It is therefore also possible in the case of autonomous vehicles to ensure increased safety and reasonable confidence in the road traffic.

The vehicle can include a visual and/or acoustic output system in the passenger compartment of the vehicle. The control unit can be configured to output, via the output system, information as to whether the vehicle is communicating with one or more detected road users. It is therefore possible for an occupant of the vehicle (for example the person seated on a driver's seat of the vehicle) to be informed as to whether the vehicle has identified a need for communication with another road user, and that the vehicle is communicating with the other road user in an autonomous fashion. If appropriate, it is also possible to use the output system to indicate with which road user communications occur. Therefore, when necessary, efficient intervention by an occupant of the vehicle is made possible.

According to a further aspect, a method for communicating between a vehicle and a road user is described. The vehicle includes features which correspond to the features of a control unit described in this document.

According to a further aspect, a vehicle (for example a passenger car, a truck or a motorcycle) is described which includes a control unit which is described in this document.

According to a further aspect, a software (SW) program is described. The SW program can be configured to be executed on a processor (for example on one or more control devices of a vehicle), and as a result to carry out the method described in this document.

According to a further aspect, a storage medium is described. The storage medium can include a SW program which is configured to be executed on a processor, and as a result to carry out the method which is described in this document.

It is to be noted that the methods, devices and systems which are described in this document can be used either alone or in combination with other methods, devices and systems described in this document. Furthermore, any aspects of the methods, devices and systems described in this document can be combined in a variety of ways with one another. In particular, the features of the claims can be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As stated at the beginning, the present invention is concerned with direct communication between a vehicle (in particular an autonomous, self propelling vehicle) and its surroundings. This direct communication typically does not require the use of a telecommunication device for wireless or wire bound telecommunication.

With increasing automation of driving systems or vehicles, the problem arises that it is difficult for road users in the form of persons to interpret the behavior of an autonomous vehicle and to estimate whether the vehicle has detected them. The information is, however, of significant importance for a road user in the form of a person, for example when the person is crossing at a pedestrian crosswalk.

Here, a system is described which permits a vehicle to communicate with road users in the form of persons, in order to indicate the occurrence of mutual perception (the vehicle perceives the road user in the form of a person and is also perceived by the road user in the form of a person). Likewise, the described system can permit communication relating to the respectively intended behavior in the road traffic.

In particular, the system described here can be configured:
- to feed back to a road user whether, and as what, the road user has been detected by the device;
- to interpret the behavior and the explicit communication of the road user and to reflect back the resulting understanding of the intentions to the road user;
- to give indications as to what action with respect to the road user the system will carry out next (for example will allow the road user in the form of a person to cross the road or allow another vehicle to feed into the flow of traffic).

It is therefore made transparent to the other road user how much the device knows and understands. In particular, the road user in the form of a person is given the possibility of communicating, and of therefore interacting in a safe way, with an automated vehicle.

Figure 1:
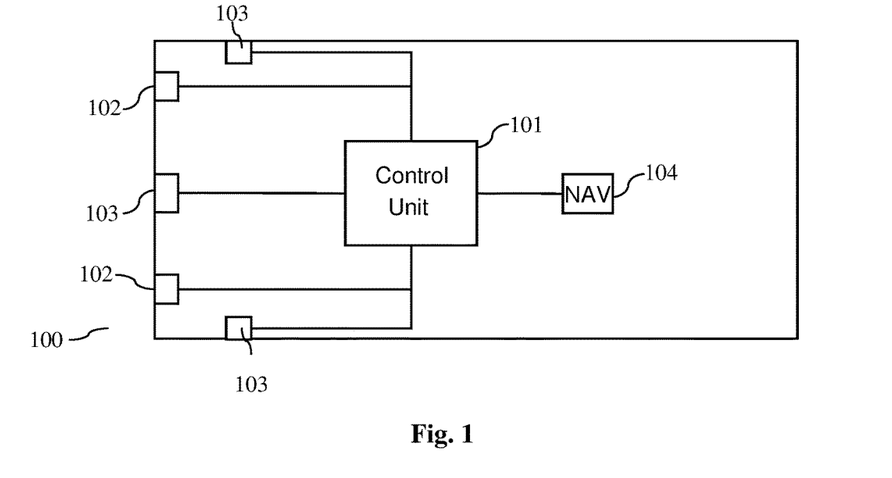
FIG. 1 is a schematic block diagram of exemplary components of a vehicle.

FIG. 1 shows a block diagram of selected components of a vehicle 100. In particular, FIG. 1 shows a control unit 101 for a vehicle 100, wherein the control unit 101 is configured to permit direct communication of the vehicle 100 with one or more road users in the surroundings of the vehicle 100. The direct communication can be in the form of communication which can be perceived directly by a sensory organ of a person, in particular without the need for a telecommunications device. For this purpose, the control unit 101 can be configured to cause the vehicle 100 to output a message in a visual and/or acoustic form to the one or more road users. This message can then be perceived directly by the eyes and/or the ears of the one or more road users.

The vehicle 100 includes one or more surroundings sensors 103 which are configured to detect information relating to the surroundings of the vehicle 100. The one or more surroundings sensors 103 can be, for example, a camera (infrared, visible light) with which image information of the surroundings can be detected. On the basis of the image information it is possible, for example, for another road user in front of or to the side of the vehicle 100 to be detected, for example a pedestrian or another vehicle. Alternatively or additionally, the one or more surroundings sensors 103 can be a radar sensor with which, for example, a distance between the vehicle 100 and another road user can be identified. The data which is made available by the one or more surroundings sensors 103 can be referred to as surroundings data.

The control unit 101 is configured to receive the surroundings data from the one or more surroundings sensors 103. Furthermore, the control unit 101 is configured to detect, on the basis of the surroundings data, one or more road users in the surroundings of the vehicle 100, in particular in the surroundings in front of the vehicle 100.

Furthermore, the control unit 101 can be configured to identify, on the basis of the surroundings data, one or more indications relating to an intention of the one or more road users. For this purpose, the control unit 101 can also use position data of a positioning unit 104 (for example from a navigation system) of the vehicle 100. The position data can include, in particular, information relating to the current position of the vehicle 100, relating to a road profile of a road on which the vehicle 100 is located, and/or relating to road signs on the road. In particular, the position data of the control unit 101 can permit the vehicle 100 and the one or more detected road users to position themselves relative to one another and relative to a road arrangement. It is therefore possible, for example, to identify that a detected pedestrian is located on a sidewalk and is standing next to a pedestrian crosswalk in order to cross a road on which the vehicle 100 is currently located. This can be an indication for the fact that the pedestrian intends to cross the road at the pedestrian crosswalk in front of the vehicle 100.

Further examples of indications relating to the intention of a road user are:
- a movement sequence of the detected road user (for example of a pedestrian) in the direction of the road on which the vehicle 100 is located;
- a hand movement of the detected road user (for example of a pedestrian) in the direction of the vehicle 100;
- a viewing direction of the detected road user (for example of a pedestrian) in the direction of the vehicle 100;
- the detection of a flashing indicator light of the detected road user (for example of another non autonomous vehicle), in order to change onto the lane of the vehicle 100.

On the basis of the surroundings data and, if appropriate, on the basis of the position data it is therefore possible to identify one or more indications of the intention of the detected other road user. Furthermore, it can be identified (in particular on the basis of the one or more indications) whether there is a need for communication between the vehicle 100 and the detected other road user. In particular, it can be identified whether there is a traffic situation (for example a risk of collision) between the vehicle 100 and the other road user, which situation requires communication between the vehicle 100 and the detected road user.

The control unit 101 can also be configured to communicate about the present traffic situation with the detected road user via a communication system 102 of the vehicle 100. In the example illustrated in FIG. 1, the communication system 102 include headlights of the vehicle 100. For example, by way of the emission of light pulses using the headlights it is possible to indicate to the detected road user that he has been perceived by the vehicle 100 and that he is being requested by the vehicle 100 to cross the road. This can then be evaluated by the road user as an indication that he can cross the road without risk.

The vehicle 100 can include a multiplicity of different communication systems 102 which can also be used in combination in order to generate a message for the detected road user. Examples of such communication systems 102 are:
- One or more visual outputs in, or in the vicinity of, the headlights which give the road user the sensation of being seen. For this purpose, the phenomenon of human visual contact can be simulated by use of moving elements which act similarly to eyes. The information of being seen can be imparted through the position of the visual outputs (for example two "eyes" or their "pupils").

A unit for projecting information by laser onto surfaces outside the vehicle. This is appropriate, for example, in order to impart to the road user that he has been perceived by the vehicle when it is not possible to establish visual contact. Furthermore, the laser projection can be used to impart additional information.

A visual output unit on the bodywork and/or the windows of the vehicle 100 can also be used in a similar way.

An output unit for directed sound. Direct communication between the vehicle 100 and a road user can also be established by use of acoustic signals.

A device for connecting personal electronic devices such as, for example, augmented reality glasses and/or what are referred to as "wearable" devices which the road user in the form of a person wears, including a transmitting unit for transmitting information to the electronic devices.

A system for moving the vehicle 100 in order to communicate the intention of the vehicle 100 by way of an indication of movement and/or a behavior of the vehicle 100.

Adaptation systems which permit an external appearance of the vehicle 100 to be adapted.

One or more visual communication systems which permit symbols and/or pictograms to be output in a targeted fashion to or for a detected road user.

In summary, the control unit 101 can be configured to process information about other road users and from other road users. Furthermore, the control unit 101 can be configured to detect and to interpret intentions of the other road users. Furthermore, the control unit 100 can be configured to generate a communication strategy (including modality, type and intensity of the output) and the associated communication contents.

The control unit 101 can be configured to detect a multiplicity of road users and communicate simultaneously with the multiplicity of road users. For this it is possible to use, where appropriate, different communication systems 102 in order to ensure unambiguous communication with the individual road users.

The control unit 101 which is described here and the corresponding method can be used, in particular, in autonomous, i.e. self propelling, vehicles 100. Alternatively or additionally, the control unit 101 can, however, also be used to make available a driver assistance function (FAS) in a largely driver controlled vehicle 100.

A vehicle 100 nowadays typically has an outer appearance which cannot be changed, or can hardly be changed. In particular the "character" of a vehicle 100 typically cannot be changed. However, a road user should be able to adopt different appearances depending on the traffic situation. In certain traffic situations persistence is necessary, and in other traffic situations it is important to relieve the tension in the situation or to appear restrained. A vehicle 100 nowadays only has the possibility of affecting the "character" with which the vehicle 100 appears to the outside by way of the driving style of the driver. In the vehicle, the appearance of the vehicle 100 is invariable. This is disadvantageous with respect to clear communication with other road users, since, in particular, the appearance of the vehicle 100 can have a large influence on the effect of the vehicle 100 on other road users.

Figure 2:
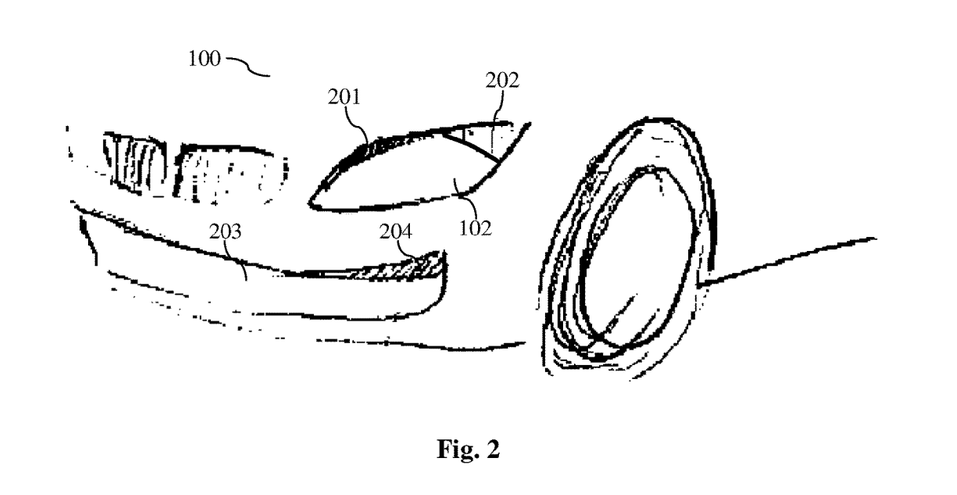
FIG. 2 is a partial perspective view of an exemplary vehicle with an adaptation system.

FIG. 2 shows an exemplary front region of a vehicle 100. In particular, FIG. 2 shows a front headlight 102 of a vehicle 100. Furthermore, FIG. 2 shows adaptation systems 201, 202 with which the appearance and/or the shape of the headlight 102 can be changed. The adaptation systems 201, 202 can, for example, include moving elements with which part of the headlight 102 can be covered or exposed. It is therefore possible for the appearance of the headlights 102 of a vehicle 100 to be changed. In particular, the appearance of the headlights 102 can be adapted as a function of what message is to be communicated to another road user (in particular to a road user in the form of a person).

Alternatively or additionally, the shape of a bumper 203 of the vehicle 100 can be adapted by adaptation system 204. In particular, an opening in the bumper 203 can be used to adapt the "character" of the vehicle 100 in order to communicate information to another road user.

The appearance of the vehicle 100 can therefore be adapted to the traffic situation and/or to the driver's mood. For this purpose, for example, switchable films or smart materials within the adaptation systems 201, 202, 204 can be used, which films or smart materials cause elements 102, 203 on the vehicle 100 to appear larger or smaller or to change their shape (usually in a subtle way). It is therefore possible, for example, for the shape of the headlights 102, which are frequently perceived as "the eyes" of the vehicle 100 to be changed in order to produce a determined effect (using the adaptation system 201) or a more open and friendly effect (using the adaptation system 202). Alternatively or additionally, visual widening or narrowing of the vehicle 100 can be performed.

The control unit 101 can identify the presence of a certain traffic situation on the basis of the surroundings data. The present traffic situation can be evaluated. Furthermore, one or more indications of emotions of the other traffic users can be identified (for example on the basis of image data). It is subsequently possible to identify the "character" and/or the appearance which the vehicle 100 should impart to other road users. In this context, if appropriate, the mood of a vehicle occupant can be identified by evaluating measurement data (for example image data of the vehicle occupant) and taking into account the identification of the appearance of the vehicle 100. The adaptation systems 201, 202, 204 of the vehicle 100 can then be made by the control unit 101 to implement the identified appearance. The vehicle 100 can also include an interface for conveying the intention of the vehicle 100.

By making available adaptation systems 201, 202, 204, the vehicle 100 can adapt itself in its emotional effect to a current traffic situation. As a result, the acceptance of actions of the vehicle 100 is increased, since the vehicle 100 always gives a "suitable" impression. The vehicle 100 therefore becomes a flexible integrated participant in the road traffic which reacts with fine antenna, can de escalate situations and can impart confidence to other road users. This is particularly important for highly automated vehicles, since the confidence and the acceptance of highly automated vehicles can be promoted by such measures. Furthermore, the vehicle 100 can underline a message to be communicated to another road user by suitable adaptation of the impression given by the vehicle 100. It is therefore possible for the independence of the vehicle 100 from interventions by the driver to be increased further.

Figure 3:
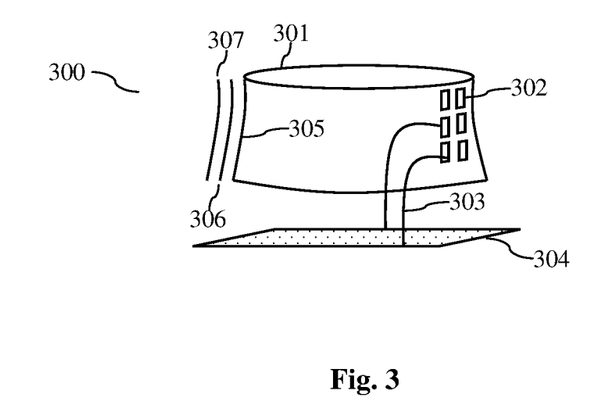
FIG. 3 is a schematic diagram of an exemplary visual communication system.

Alternatively or additionally, the vehicle 100 can include communication systems 102 which are configured to communicate with another road user by way of visual signals. FIG. 3 shows an exemplary visual communication system 300 which can be arranged, for example, on an engine hood of the vehicle 100 (for example under an emblem of the manufacturer of the vehicle 100). In the illustrated example, the visual communication system 300 has a round shape, and can therefore be seen from different directions by another road user.

The visual communication system 300 has a frame 301 which has, for example, a cylindrical shape. A multiplicity of light sources 302 are arranged on a side face of the communication system 300. The light sources 302 can be implemented, for example, by use of LEDs (light emitting diodes). In the illustrated example, the communication system 300 has an LED matrix 304, wherein the light of the individual LEDs is guided to the individual light sources 302 by way of optical waveguides 303. The side face of the communication system 300 can be constructed from a multiplicity of layers 305, 306, 307. For example, the side face can have a diffuser 305, a plastic carrier 306 and/or a Vikuiti film. Alternatively or additionally, light sources (for example LEDs) can also be arranged directly on the side face of the communication system 300.

The side face of the communication system 300 therefore has a multiplicity of light sources 302. The multiplicity of light sources 302 can be used by the vehicle 100 to communicate with another road user. In particular, different symbols and/or pictograms can be displayed as a visual output of the communication system 300 by the multiplicity of light sources 302.

The visual communication system 300 therefore has individually actuable light points 302 (for example an LED grid). The visual communication system 300 can be used as an indication of the (H)AF mode of the vehicle 100 in traffic. Alternatively or additionally, the visual communication system 300 can serve to impart the perception, intention and requirements of the (H)AF 100 to other road users.

In particular, symbols (for example an arrow) can be displayed on the communication system 300. Alternatively or additionally, messages can be encoded in light signals (for example pulsing, dimming with a gradient over time and/or area, etc.).

The vehicle 100 can have one or more visual communication systems 300. The one or more communication systems 300 can be positioned, for example, on the engine hood (for example under the emblem) of the vehicle 100, on the flashing indicator light and/or at the rear of the vehicle 100. The information emitted by a communication system 300 (for example symbols/signals, brightness, color, orientation, speed etc.) can be adapted to one or more of the following aspects:

- a current traffic situation;
- environmental conditions (weather, ambient light);
- the road user with which communication is to take place (for example the position, the type and/or the speed of the road user); and/or
- the speed of the vehicle 100.

In addition, the control unit 101 can decide on the basis of the abovementioned aspects which one or more of a plurality of visual communication systems 300 of a vehicle 100 are being used to communicate with a road user.

On the basis of data relating to the position of the other road user, the orientation and shape of the emitted signal can be adapted within a visual communication system 300. It is therefore possible, for example, to direct the symbols or the light signals onto the road user who needs to be reached, and to display them in the corresponding confusion, with the result that the road user can perceive them in an optimum way.

So that a road user feels addressed by a signal which is emitted by the visual communication system 300, a special symbol system can optionally be used, for example two light strips or light points which explicitly point to the road user, with the result that the latter knows that he has been seen and/or that he is being addressed by the visual communication system 300.

The communication system 300 can be arranged so as to be lowerable in the vehicle 100, with the result that the communication system is visible only in an active mode (for example only in the (H)AF mode).

A vehicle 100 can therefore include at least one visual communication system 300, in each case with a device for lowering/extending or with a permanent securing means. The control unit 101 can be configured to identify light signals/symbols which are to be output by the visual communication system 300. Furthermore, the control unit 101 can cause the visual communication system 303 (in particular the individual light sources 302) to output the identified light signals/symbols.

The light signals/symbols can be determined as a function of a detected traffic situation, of a detected road user and/or of detected environmental conditions. For this purpose, the surroundings data of the one or more surroundings sensors 103 of the vehicle 100 can be evaluated.

The control unit 101 can be configured to detect an (H)AF mode of the vehicle 100. The visual communication system 300 can, under certain circumstances, be used only when the vehicle 100 is in the (H)AF mode. Furthermore, the vehicle 100 can include an interface for HAF control, via which interface the perception and intention of the vehicle 100 is imparted. Furthermore, the vehicle 100 can optionally have in the passenger compartment an operator control element which permits manual selection and transmission of a communication/message via the visual communication system 300.

As illustrated in FIG. 3, the visual communication system 300 can have an annular LED grid behind a plastic 306. The visual communication system 300 can be arranged under an emblem on the engine hood of the vehicle 100. The multiplicity of light sources 302 can be made available by use of an LED grid which is arranged in an annular shape. In order to achieve higher resolution, an LED matrix 304 can be used under the engine hood, wherein an optical waveguide 303 is led from each LED of the matrix 304 behind the plastic 306, in order to make available a light source 302. Alternatively or additionally, each LED row (or each LED ring) on the side wall of the communication system 300 can be composed of two circuit boards which are located one behind the other and can be equipped in an offset fashion with LEDs, in order to increase the resolution of the LED grid. The front row then has in each case a recess in the carrier material at the location where an LED from the rear row shines through.

The LEDs, i.e. the individual light sources 302 can be connected to one another, for example, in a row or in a ring shape and can be actuated, in particular, by the control unit 101. In this context, it is possible to control the color and/or the intensity of each individual LED. If appropriate, the LEDs may not be individually visible through the plastic 306, which can be brought about, for example, by use of a diffuser film 305 and/or by means of a plastic cap with semi-transparent material or with suitable surface properties and/or with a spacer element between the LEDs and the plastic. In order to define an irradiation direction and in order, for example, to avoid reflections on the surface coating of the vehicle 100, it is possible to use a film 307 (for example a Vikuiti film) or a material property of the plastic 306 which reduces the irradiation angle of light. The limitation of the irradiation angle also serves, for example, to ensure that directed light is emitted only toward a road user. For this purpose, it is possible to control the film 307 and/or the plastic 306 (for example the direction of emission can be variable as a function of, for example, the position of the road user's eyes). Furthermore, the visual communication unit can include a cooling system (for example a fan or a cooling assembly).

By way of the communication system 300 described here, it is possible to ensure the acceptance of a highly automatic vehicle 100 and to ensure smooth interaction between a highly automatic vehicle 100 and other road users. In particular, in this way the vehicle 100 can reliably communicate with another road user without the need for an interaction by a driver of the vehicle. Furthermore, the traffic flow can be improved by the communication system 300 on the basis of smooth communication between the vehicle 100 and another road user. Furthermore, the safety in traffic can be increased by preventing misunderstandings (i.e. by means of clear communication of intentions).

Figure 4:
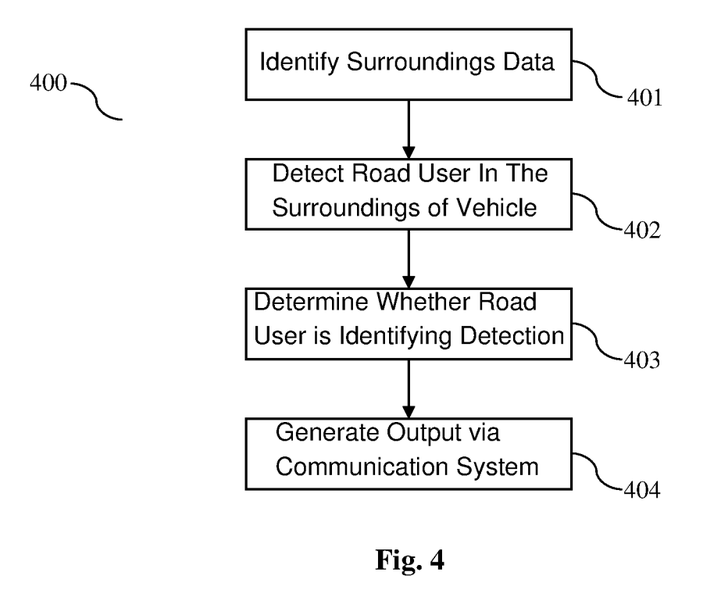
FIG. 4 is a flowchart of an exemplary method for communication between a vehicle and a road user.

FIG. 4 shows a flowchart of an exemplary method 400 for direct communication between a vehicle 100 and a road user. The method 400 includes the identification 401 of surroundings data on the basis of one or more surroundings sensors 103 of the vehicle 100. In particular, image data of the surroundings of the vehicle can be identified by use of a camera. Furthermore, the method 400 includes the detection 402 of at least one road user in the surroundings of the vehicle 100 on the basis of the surroundings data. For example, a road user in the form of a person can be detected in the surroundings of the vehicle. The method 400 can also include the determination 403, on the basis of the surroundings data, that the road user is in the process of identifying whether he has been detected by the vehicle 100. For example, it is possible to detect on the basis of the surroundings data that the road user in the form of a person is looking in the direction of the vehicle 100. Furthermore, it is possible to determine, for example on the basis of a facial expression of the road user in the form of a person, whether the road user in the form of a person is just in the process of identifying whether he has been detected by the vehicle 100.

The method 400 also includes the generation 404 of an output by way of one or more communication systems 102, 201, 202, 204, 300 of the vehicle 100, in particular if it has been determined that the road user is in the process of identifying whether he has been detected by the vehicle 100. The output can then be designed to indicate to the road user that he has been detected by the vehicle 100. For this purpose, a visual and/or acoustic output and/or adaptation of the appearance of the vehicle 100 can be carried out. This ensures that the road user can better estimate the future actions of the vehicle 100, since he knows that he has been detected by the vehicle, and the vehicle 100 will therefore take into account the road user in the future actions.

The measures described herein can improve safety in mixed road traffic with road users in the form of persons and computer-controlled or autonomous vehicles. Furthermore, this can increase the acceptance of vehicles with driver assistance systems for partially automated driving (TAF), for highly automated driving (HAF) and for autonomous driving.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for a vehicle, comprising:
a control unit of the vehicle, the control unit being configured to execute a program to:
receive surroundings data from one or more surroundings sensors of the vehicle;
detect at least one road user in the surroundings of the vehicle based on the received surroundings data;
determine, based on the received surroundings data, whether there is a need for communication between the detected road user and the vehicle; and
if there is a need for communication between the road user and the vehicle, control one or more visual communication systems of an adaptation system of the vehicle to generate a visual output in order to communication with the detected road user, wherein the one or more visual communication systems is cylindrical and includes a side face and a multiplicity of light sources arranged on the side face configured to be selectively activated to generate the visual output in a first direction that is not visible in a second direction.

2. The system according to claim 1, wherein
the one or more visual communication systems includes at least one LED.

3. The system according to claim 1, wherein
the one or more visual communication systems includes an LED matrix, and
light of individual LEDs of the LED matrix is guided to the individual light sources by way of optical waveguides.

4. The system according to claim 1, wherein
the side face of the one or more communication systems is formed from a multiplicity of layers, at least one of the layers including one of:
a diffuser,
a plastic carrier, and
a rear projection film.

5. The system according to claim 1, wherein
the multiplicity of light sources are arranged directly arranged on the side face of the one or more visual communication systems.

6. The system according to claim 1, wherein
the control unit is configured to display on the one or more visual communication systems at least one of:
a symbol,
a pictogram, and
light signals encoding messages.

7. The system according to claim 1, wherein
the side face comprises a multiplicity of light points by which at least one of a graphical symbol and a pictogram is displayable as the visual output.

8. The system according to claim 1, wherein
the one or more visual communication systems are arranged so as to be lowerable in the vehicle such that the visual communication system is visible only in a predetermined driving mode of the vehicle.

9. The system according to claim 1, wherein
the control unit is further configured to execute a program to:
determine, based on the received surroundings data, a position of the road user relative to the vehicle, and
control the adaptation system to adapt an external appearance of the vehicle as a function of the position of the road user.

10. The system according to claim 1, wherein
the control unit is further configured to execute a program to:
- identify a traffic situation between the vehicle and the road user based on the surroundings data;
- determine an intention of the vehicle with respect to the identified traffic situation; and
- control the adaptation system to adapt an external appearance of the vehicle as a function of at least one of the identified traffic situation and the determined intention of the vehicle.

11. The system according to claim 1, wherein
the adaptation system includes one or more of:
- a headlight appearance changing device of the vehicle;
- a bumper appearance changing device of the vehicle;
- a side mirror, windshield, mud flap and/or engine hood appearance changing device of the vehicle;
- one or more moving elements of the vehicle;
- a color changing material or a color changing surface of the vehicle;
- a shape changing material or surface of the vehicle; and
- a side window and/or a vehicle windshield transparency changing system.

12. The system according to claim 1, wherein
the control unit is further configured to execute a program to:
- identify that the vehicle is in an automatic driving mode in which the vehicle moves in road traffic without any driver intervention; and
- subsequently, control the one or more visual communication systems to be moved from a first position, in which the one or more visual communication systems cannot be seen from outside the vehicle, into a second position in which the one or more visual communication systems can be seen from outside the vehicle.

13. The system according to claim 1, wherein
the control unit is further configured to execute a program to:
- determine lighting conditions in the surroundings of the vehicle based on the surroundings data; and
- adapt the visual output generated by the one or more visual communication systems as a function of the determined lighting conditions.

14. The system according to claim 1, wherein
the control unit is further configured to execute a program to:
- identify a position of the road user relative to the vehicle based on the surroundings data; and
- adapt the visual output generated by the one or more visual communication systems as a function of the identified position of the road user.

15. The system according to claim 1, wherein
the control unit is further configured to execute a program to:
- cause the one or more visual communication systems of the vehicle to generate a visual output comprising at least one of a symbol and a pictogram which points in a direction of the detected road user.

16. The system according to claim 1, wherein:
the road user is a person;
the control unit is further configured to
- detect eyes of the person based on the surroundings data, and
- determine, based on the detected eyes of the person, a need for communication between the road user and the vehicle.

17. The system according to claim 1, wherein
the control unit is further configured to:
- identify one or more indications of an intention of the road user based on the surroundings data;
- determine, based on the one or more indications, that there is a traffic situation between the vehicle and the road user that requires communication between the vehicle and the road user; and
- actuate one or more of the visual communication systems as a function of the traffic situation.

18. The system according to claim 1, wherein:
the vehicle includes an output device in a passenger compart of the vehicle, and
the control unit is further configured to output, via the output device, information as to whether the vehicle is communicating with the detected road user.

* * * * *